(12) United States Patent  (10) Patent No.: US 8,276,966 B2
Souma et al.  (45) Date of Patent: Oct. 2, 2012

(54) STRUCTURE FOR LOWER PART OF REAR VEHICLE BODY

(75) Inventors: Takayuki Souma, Hamamatsu (JP); Hiroyasu Shiromura, Hamamatsu (JP); Katsunori Tannai, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/113,494

(22) Filed: May 23, 2011

(65) Prior Publication Data

US 2011/0290838 A1 Dec. 1, 2011

(30) Foreign Application Priority Data

May 26, 2010 (JP) .................................. 2010-120359

(51) Int. Cl.
 *B62D 25/08* (2006.01)
(52) U.S. Cl. .................................. 296/37.2; 296/187.11
(58) Field of Classification Search ............. 296/187.11, 296/187.09, 193.08, 37.2
See application file for complete search history.

(56) References Cited

U.S. PATENT DOCUMENTS 7,540,559 B2 * 6/2009 Egawa et al. ............ 296/203.04

FOREIGN PATENT DOCUMENTS

| CN | 1907788 A | 2/2007 |
| JP | 10-316050 A | 12/1998 |

OTHER PUBLICATIONS

Chinese Office Action for Application No. 201110139148.X dated Jul. 4, 2012 with English translation of excerpts.

* cited by examiner

*Primary Examiner* — Joseph Pape
(74) *Attorney, Agent, or Firm* — Lerner, David, Littenberg, Krumholz & Mentlik, LLP (57) ABSTRACT

A structure is in a lower part of a rear vehicle body 1. In this structure, each rear side member 2 is divided into a rear side member front part 10 and a rear side member rear part 11 in a front-to-rear direction of the vehicle, a cross member 26 below a spare tire housing is joined to the rear side member rear part 11, and a central part in a vehicle width direction 26a of the cross member 26 below the spare tire housing extends rearward in the vehicle and is curved obliquely downward.

10 Claims, 4 Drawing Sheets

STRUCTURE FOR LOWER PART OF REAR VEHICLE BODY

CROSS REFERENCE TO RELATED APPLICATION

This application claims the benefit of the filing date of Japanese Patent Application No. 2010-120359 filed May 26, 2010, the entire disclosure of which is hereby incorporation by reference.

BACKGROUND OF THE INVENTION

1. Field of the Invention

The present invention relates to a structure for a lower part of a rear vehicle body including a spare tire housing formed in a rear floor of the rear vehicle body.

2. Description of Related Art

A typical vehicle includes a spare tire housing for housing a spare tire, in a rear floor of a rear vehicle body. When a load is applied to the vehicle with such a structure from the rear of the vehicle, the spare tire housing is sometimes deformed and moved toward the front of the vehicle. Since a fuel tank is arranged ahead of the spare tire housing in the vehicle, in particular, the deformed spare tire housing may come into contact with the fuel tank.

A conceivable countermeasure to such a case is to secure a distance between the spare tire housing and the fuel tank to let a space around the spare tire housing absorb the load.

Meanwhile, the distance between the spare tire housing and the fuel tank cannot be sufficiently secured in many cases because a space to house components other than the spare tire housing and the fuel tank also needs to be secured, and there are many restrictions in the layout of vehicle body components. Moreover, in the case of a compact car, it is difficult to secure sufficient space around the spare tire housing.

To cope with this, JP 10-316050 A (hereinafter Patent Document 1) discloses a structure in which a bottom surface of a spare tire housing is formed to be inclined obliquely, that is, to extend from its front side rearwardly downward to prevent the deformed spare tire housing from coming into contact with a rear differential device and a fuel tank. In addition, a reinforcement extending in a front-to-rear direction of a vehicle is arranged below the bottom surface of the spare tire housing, and a sloped guide surface is formed in the reinforcement. The sloped guide surface guides and helps the spare tire housing to ride over the rear differential device.

Accordingly, with the structure disclosed in Patent Document 1, the spare tire housing is deformed while being guided by the guide surface of the reinforcement toward above the rear differential device when a load is applied from the rear of the vehicle, which prevents the spare tire housing from interfering with the rear differential device and the fuel tank. Moreover, when the spare tire housing is deformed, the spare tire is rotated while moving its upper edge part rearward in the vehicle, which makes the spare tire less likely to come into contact with a backseat.

In the configuration in Patent Document 1, however, the reinforcement is provided to a lower surface of the spare tire housing, and therefore the spare tire housing has such a high surface rigidity that the spare tire housing is less likely to be deformed when a load is applied from the rear of the vehicle. This causes a problem that the load from the rear of the vehicle cannot be absorbed efficiently.

Furthermore, in the configuration in Patent Document 1, the guide surface of the reinforcement below the lower surface of the spare tire housing comes into contact with the rear differential device when the spare tire housing is deformed. For this reason, there is a problem that the load received from the rear of the vehicle is transmitted to structures arranged in the front, such as the rear differential device.

SUMMARY OF THE INVENTION

The present invention has been made in view of the above circumstances. An object of the present invention is to provide a structure for a lower part of a rear vehicle body which allows deformation of a spare tire housing and rotation of a spare tire to be more smoothly performed when a load is applied from a rear of a vehicle, and thus allows improvement in load absorption efficiency.

In order to solve the above problem of the conventional technique, a structure for a lower part of a rear vehicle body according to the present invention includes a spare tire housing which is formed in a rear floor of the rear vehicle body and configured to house a spare tire, a cross member below the spare tire housing which is arranged below the spare tire housing and joined to rear side members located at both left and right sides thereof, and a rear bumper member which is arranged in a rear edge part of the rear floor. In the structure, a bottom surface rear part of the spare tire housing includes an inclined part extending toward a rear of a vehicle and being inclined obliquely downward, and the spare tire is arranged in such an inclined state that a front part thereof is located at a position higher than a rear part thereof, and each rear side member is divided into a rear side member front part and a rear side member rear part in a front-to-rear direction of the vehicle, and the cross member below the spare tire housing is joined to the rear side member rear part, and a central part in a vehicle width direction of the cross member below the spare tire housing extends rearward in the vehicle and is curved obliquely downward.

In addition, according to another aspect of the present invention, the rear side member front part is more rigid than the rear side member rear part.

Additionally, according to another aspect of the present invention, a fragile part which is less rigid than the rear side member front part and the rear side member rear part is provided at a division position of the rear side member front part and the rear side member rear part.

Moreover, according to another aspect of the present invention, a tow hook bracket extending in the front-to-rear direction of the vehicle is provided in the central part in the vehicle width direction of the cross member below the spare tire housing, and the tow hook bracket has a front edge part joined to the cross member below the spare tire housing and a rear edge part joined to the rear edge part of the rear floor.

Furthermore, according to another aspect of the present invention, a bottom surface front part of the spare tire housing includes a flat part, the inclined part in the bottom surface rear part of the spare tire housing extends from the flat part rearward in the vehicle and is inclined obliquely downward, and a boundary part between the flat part and the inclined part is formed substantially linearly in the vehicle width direction, and the boundary part between the flat part and the inclined part is located at the same position in the front-to-rear direction of the vehicle as the division position of the rear side member front part and the rear side member rear part.

Furthermore, according to another aspect of the present invention, the cross member below the spare tire housing is joined to each of the rear side member rear parts at a position near the division position of the rear side member front and rear parts.

In addition, according to another aspect of the present invention, a spare tire bracket is arranged in the inclined part of the bottom surface rear part of the spare tire housing, and the spare tire is attached to the spare tire housing with the spare tire bracket.

Additionally, according to another aspect of the present invention, a front edge part of the housed spare tire is located at a position higher than an axis line passing through the center of the rear bumper member, and a rear edge part of the housed spare tire is located at a position lower than the axis line passing through the center of the rear bumper member.

Moreover, according to another aspect, the present invention further includes a cross member in front of the spare tire housing which is arranged ahead of the spare tire housing in the vehicle and joined to the rear side members located at both left and right sides thereof, wherein the cross member in front of the spare tire housing is joined to each rear side member front part.

Furthermore, according to another aspect, the present invention further includes a reinforcement member which is joined to the cross member in front of the spare tire housing and the rear side member front part and extends along a periphery of a front part of the spare tire housing.

The structure for a lower part of a rear vehicle body according to the present invention includes a spare tire housing which is formed in a rear floor of the rear vehicle body and configured to house a spare tire, a cross member below the spare tire housing which is arranged below the spare tire housing and joined to rear side members located at both left and right sides thereof, and a rear bumper member which is arranged in a rear edge part of the rear floor. In the structure, a bottom surface rear part of the spare tire housing includes an inclined part extending toward a rear of a vehicle and being inclined obliquely downward, and the spare tire is arranged in such an inclined state that a front part thereof is located at a position higher than a rear part thereof, and each rear side member is divided into a rear side member front part and a rear side member rear part in a front-to-rear direction of the vehicle, the cross member below the spare tire housing is joined to the rear side member rear part, and a central part in a vehicle width direction of the cross member below the spare tire housing extends rearward in the vehicle and is curved obliquely downward.

With the above structure, when a load is applied from the rear of the vehicle to the rear vehicle body, the load is transmitted to the rear side members through the bumper attachment parts, and is also transmitted to the central part in the vehicle width direction of the cross member below the spare tire housing which extends rearward in the vehicle. In this event, each rear side member is bent at the division position by the load. At the same time, the central part in the vehicle width direction of the cross member below the spare tire housing obtains torque by the load and thereby helps deformation of the spare tire housing below the spare tire housing. As a result, the bottom surface rear part of the spare tire housing is bent downward. In this manner, when the spare tire housing is deformed by the load, the spare tire arranged in an inclined manner is vertically rotated greatly in such a way that the front part thereof is moved rearward in the vehicle.

Furthermore, each rear side member is designed to be likely to be bent at the division position, and a bottom surface of the spare tire housing is also designed to be likely to be bent at the inclined part. In addition, since the rear side member and the spare tire housing are bent in the same direction, the rear side member and the spare tire housing are deformed smoothly, so that the load applied to the rear vehicle body can be reliably absorbed.

Furthermore, when a load is applied from the rear of the vehicle to the rear vehicle body, the spare tire is vertically rotated greatly in such a way that the front part thereof is moved rearward in the vehicle. Accordingly, the front edge of the spare tire never comes into contact with structures arranged in the front, such as a fuel tank, at the time of the rotation of the spare tire.

Furthermore, when a load is applied from the rear of the vehicle to the rear vehicle body, the bottom surface rear part of the spare tire housing is bent downward. This inhibits the spare tire housing from moving forward, so that the bottom surface of the spare tire housing never comes into contact with structures arranged in the front, such as the fuel tank.

Furthermore, according to the structure for the lower part of the rear vehicle body of the present invention, the rear side member front part is more rigid than the rear side member rear part. Accordingly, when a load is applied from the rear of the vehicle to the rear vehicle body, the rear side member is deformed in such a way that the less rigid rear side member rear part is first deformed, and the rear side member is bent at the division position after the rear side member rear part is deformed to some extent. Hence, when a load is applied from the rear of the vehicle to the rear vehicle body, the load can be effectively absorbed by the deformation of the rear side member rear part.

Furthermore, according to the structure for the lower part of the rear vehicle body of the present invention, the fragile part which is less rigid than the rear side member front part and the rear side member rear part is provided at the division position of the rear side member front part and the rear side member rear part. Thus, the rear side member is more likely to be bent at the division position. Thereby, the rear side member and the spare tire housing are deformed more smoothly, so that the load applied to the rear vehicle body can be more effectively absorbed.

Furthermore, according to the structure for the lower part of the rear vehicle body of the present invention, the tow hook bracket extending in the front-to-rear direction of the vehicle is provided in the central part in the vehicle width direction of the second rear cross member. The tow hook bracket has the front edge part joined to the second rear cross member and the rear edge part joined to the rear edge part of the rear floor. Thus, when a load is applied from the rear of the vehicle to the rear vehicle body, the load is transmitted to the central part in the vehicle width direction of the cross member below the spare tire housing through the tow hook bracket. In other words, the load from the rear of the vehicle is more likely to be transmitted to the central part in the vehicle width direction of the cross member below the spare tire housing, which helps deformation of the spare tire housing. Thereby, the spare tire housing can be deformed more reliably and quickly. As a result, the load applied to the rear vehicle body can be more effectively absorbed, and the spare tire can be rotated reliably.

Furthermore, according to the structure for the lower part of the rear vehicle body of the present invention, the boundary part between the flat part and the inclined part of the spare tire housing is formed substantially linearly in the vehicle width direction, and the boundary part between the flat part and the inclined part is located at the same position in the front-to-rear direction of the vehicle as the division position of the rear side member front part and the rear side member rear part. Accordingly, when a load is applied from the rear of the vehicle to the rear vehicle body, the bottom surface of the spare tire housing is bent linearly at the boundary part. Moreover, since the position at which the rear side member is bent is located at the same position in the front-to-rear direction of the vehicle as the position at which the spare tire housing is bent, the rear side member and the spare tire housing are likely to be bent in the same direction when a load is applied from the rear of the vehicle to the rear vehicle body. Thereby, the rear side member and the spare tire housing can be deformed more reliably and quickly. As a result, the load applied to the rear vehicle body can be more effectively absorbed, and the spare tire can be rotated reliably.

Furthermore, according to the structure for the lower part of the rear vehicle body of the present invention, the second rear cross member is joined to the rear side member front part and the rear side member rear part at a position near the division position. Thus, when a load is applied from the rear of the vehicle to the rear vehicle body, the load transmitted to the central part in the vehicle width direction of the cross member below the spare tire housing is transmitted to the division position of the rear side member front part and the rear side member rear part, which further helps the rear side member to be bent at the division position. Thereby, the rear side member is deformed more smoothly, so that the load applied to the rear vehicle body can be more reliably absorbed.

Furthermore, according to the structure for the lower part of the rear vehicle body of the present invention, the spare tire bracket is arranged in the inclined part in the bottom surface rear part of the spare tire housing. Moreover, the spare tire is attached to the spare tire housing with the spare tire bracket. Accordingly, the spare tire is attached to the spare tire housing on the side bent downward (inclined part). Thereby, the load from the rear floor is effectively transmitted to the spare tire bracket, which further helps the front part of the spare tire to rotate rearward in the vehicle.

Furthermore, according to the structure for the lower part of the rear vehicle body of the present invention, the front edge part of the housed spare tire is located at a position higher than the axis line passing through the center of the rear bumper member, and the rear edge part of the housed spare tire is located at a position lower than the axis line passing through the center of the rear bumper member. With this structure, the location at which the load from the rear of the vehicle is first applied (rear bumper member) is located at substantially the same position in the front-to-rear direction of the vehicle as the center of rotation of the spare tire. Thus, torque is likely to be generated in the spare tire, which further helps the spare tire to rotate.

Furthermore, the structure for the lower part of the rear vehicle body of the present invention further includes the first rear cross member which is arranged ahead of the spare tire housing in the vehicle and joined to the rear side members located at both left and right sides thereof, and the first rear cross member is joined to each rear side member front part. This inhibits a part ahead of the cross member in front of the spare tire housing from being deformed. This also helps deformation of the rear floor, which further helps the front part of the spare tire to rotate rearward in the vehicle.

Furthermore, the structure for the lower part of the rear vehicle body of the present invention further includes the reinforcement member which is joined to the first rear cross member and the rear side member front part and extends along the periphery of the front part of the spare tire housing. This makes the bottom surface front part of the spare tire housing more rigid, and thereby makes the bottom surface front part of the spare tire housing less likely to be bent when a load is applied from the rear of the vehicle to the rear vehicle body. Thus, only the bottom surface rear part of the spare tire housing is neatly bent while the bottom surface front part of the spare tire housing is kept undeformed. Thus, torque is likely to be generated in the spare tire, which further helps the spare tire to rotate.

DETAILED DESCRIPTION OF PREFERRED EMBODIMENTS

Hereinbelow, a structure for a lower part of a rear vehicle body according to an embodiment of the present invention will be described with reference to the drawings. FIGS. 1 to 6 show the structure for a lower part of a rear vehicle body according to the embodiment of the present invention.

Figure 1:
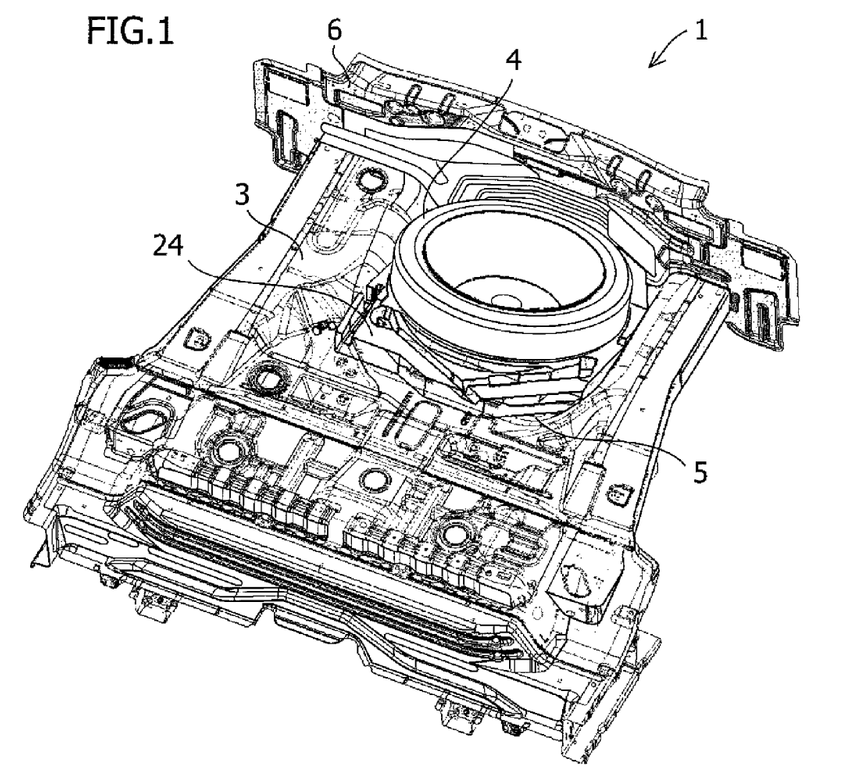
FIG. 1 is a perspective view of a rear vehicle body according to an embodiment of the present invention, which is seen from above.
Figure 2:
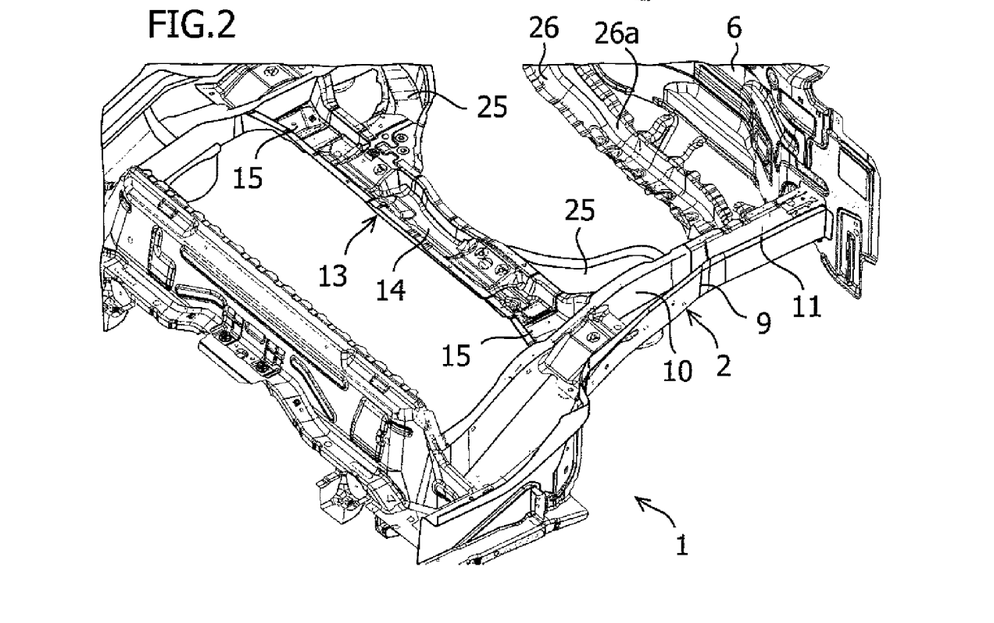
FIG. 2 is an enlarged perspective view of the rear vehicle body according to the embodiment of the present invention, which is seen from above and from which a rear floor panel is removed.
Figure 3:
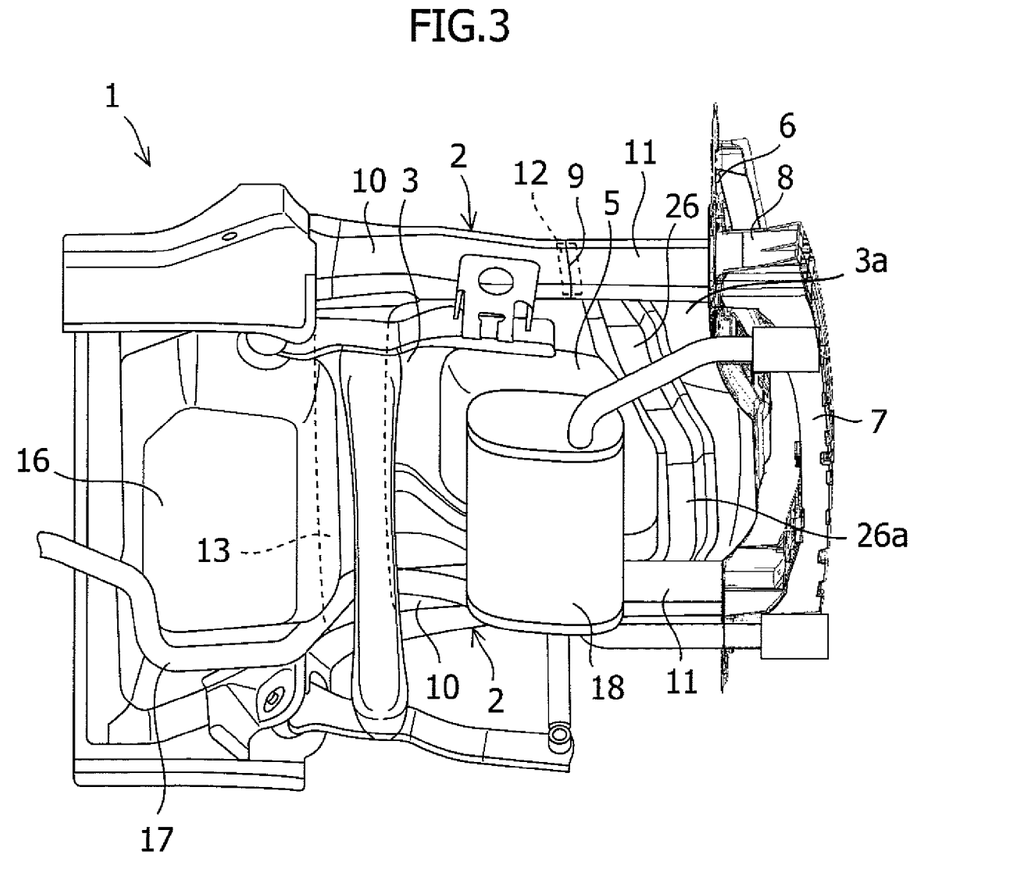
FIG. 3 is a perspective view of the rear vehicle body according to the embodiment of the present invention, which is seen from below.
Figure 4:
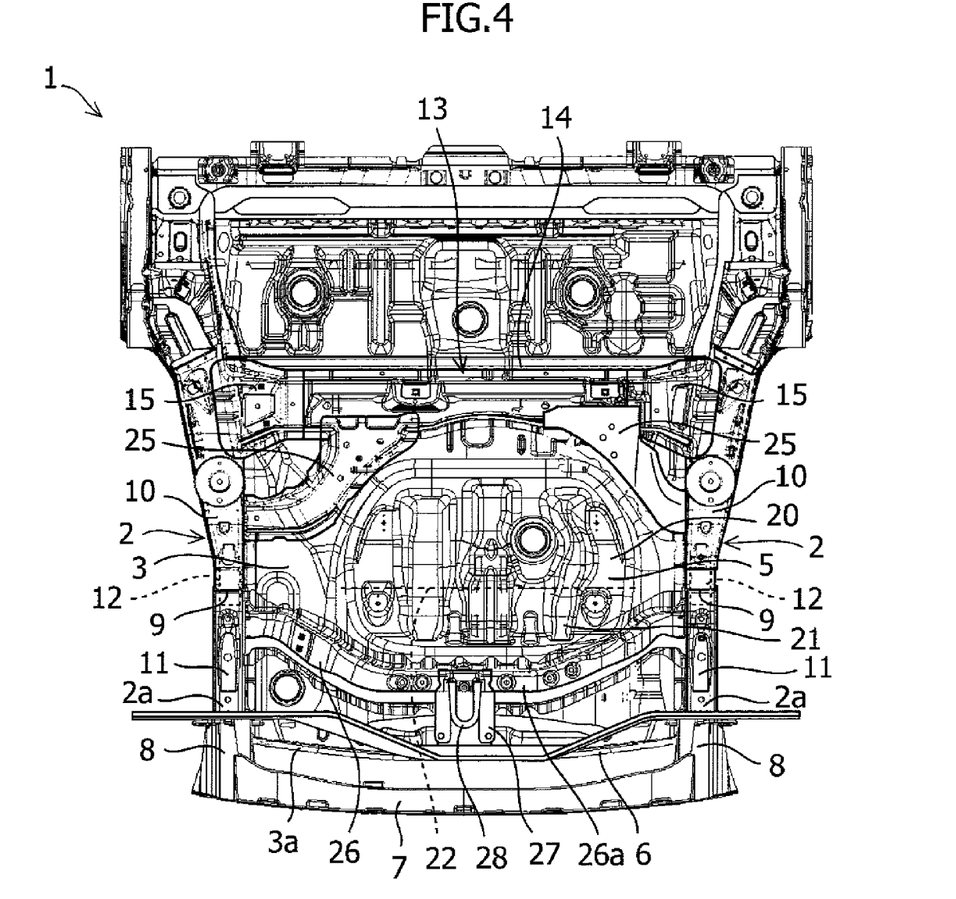
FIG. 4 is a plan view of the rear vehicle body according to the embodiment of the present invention, which is seen from below.

As shown in FIGS. 2 to 5, a pair of rear side members 2 extending in a front-to-rear direction of a vehicle are arranged in a lower part of a rear vehicle body 1 of the vehicle according to the embodiment of the present invention. In addition, as shown in FIGS. 1, 3, and 4, a rear floor 3 is arranged above the pair of rear side members 2, and both side parts of the rear floor 3 are respectively joined to the rear side members 2 arranged at both left and right sides of the rear floor 3. Furthermore, a spare tire housing 5 for housing a spare tire 4 is provided in a substantially central part of the rear floor 3. The spare tire housing 5 is formed to be concave toward a bottom of the vehicle.

As shown in FIGS. 3 to 6, the rear floor 3 extends rearward of the spare tire housing 5 in the vehicle, and a back panel 6 and a rear bumper member 7 are arranged in a rear edge part 3a of the rear floor 3. As shown in FIGS. 3 and 4, the rear bumper member 7 is attached to the rear edge part 3a of the rear floor 3 through bumper attachment parts 8 arranged at both left and right sides of the rear bumper member 7. A rear end part 2a of each rear side member 2 and the corresponding bumper attachment part 8 are arranged in a substantially straight line in the front-to-rear direction of the vehicle.

In this embodiment, as shown in FIGS. 2 to 5, each rear side member 2 is divided into a rear side member front part 10 and a rear side member rear part 11 at a division position 9 in the front-to-rear direction of the vehicle. Here, the rear side member front part 10 is more rigid than the rear side member rear part 11. Methods for improving the rigidity of the rear side member front part 10 may include a method of increasing the thickness of the rear side member front part 10 and a method of increasing the cross section of the rear side member front part 10.

Furthermore, in this embodiment, as shown in FIGS. 3 and 4, a fragile part 12 is provided at the division position 9 of the rear side member front part 10 and the rear side member rear part 11. The fragile part 12 is less rigid than the rear side member front part 10 and the rear side member rear part 11. The fragile part 12 is designed to be bent upward in a convex shape (cause reverse-V-shape bending) upon receiving a load from the rear of the vehicle. Methods for forming the configuration of the fragile part 12 may include a method in which the division position 9 of the rear side member front part 10 and the rear side member rear part 11 is formed to be slightly curved upward in advance and a method in which a bead part is formed at the division position 9 of the rear side member front part 10 and the rear side member rear part 11 so that the fragile part 12 can be bent upward.

As shown in FIGS. 2 and 4, a first rear cross member (a cross member in front of the spare tire housing) 13 is arranged ahead of the spare tire housing 5 in the vehicle. The first rear cross member 13 is joined to the rear side member front parts 10 located at both left and right sides of the first rear cross member 13. In addition, the first rear cross member 13 extends in a vehicle width direction. Furthermore, the first rear cross member 13 comprises a center cross member 14 and two side cross members 15. The center cross member 14 is arranged at a central position in the vehicle width direction. The side cross members 15 are connected to the rear side member front parts 10 respectively and arranged at both left and right sides of the center cross member 14. Thus, the first rear cross member 13 has a three-section structure in the vehicle width direction.

As shown in FIG. 3, a fuel tank 16 is arranged below the rear floor 3 at a position in which the first rear cross member 13 is located. The fuel tank 16 is supported from below by a suspension belt (not shown) arranged to be suspended between the first rear cross member 13 and the rear floor 3. Further, below the rear floor 3, an exhaust pipe 17 is arranged to extend from an engine (not shown) rearward in the vehicle through an exhaust system heat exchanger (not shown) and the like. A muffler 18 for reducing exhaust noise is provided to the exhaust pipe 17. The muffler 18 is suspended by a bracket (not shown) or the like at a position below the spare tire housing 5.

Figure 6:
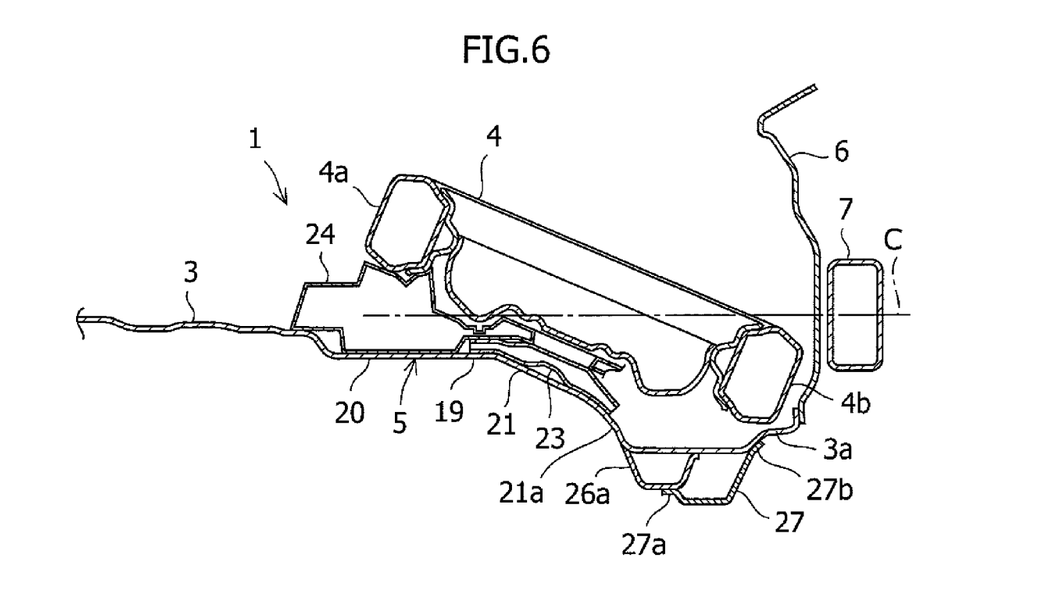
FIG. 6 is a cross-sectional view in a front-to-rear direction of a vehicle of the rear vehicle body according to the embodiment of the present invention.

As shown in FIG. 6, in this embodiment, a bottom surface 19 of the spare tire housing 5 includes a flat part 20 in a bottom surface front part and an inclined part 21 in a bottom surface rear part. The inclined part 21 extends from the flat part 20 rearward in the vehicle and is inclined obliquely downward.

As shown in FIG. 4, in this embodiment, a boundary part 22 between the flat part 20 and the inclined part 21 is formed substantially linearly in the vehicle width direction. The boundary part 22 between the flat part 20 and the inclined part 21 is located at the same position in the front-to-rear direction of the vehicle as the division position 9 of the rear side member front part 10 and the rear side member rear part 11.

As shown in FIG. 6, in the inclined part 21 in the bottom surface rear part of the spare tire housing 5, a spare tire bracket 23 for attaching a central part of the spare tire 4 is provided to protrude upward. Furthermore, a spare tire spacer 24 is arranged in the periphery of the spare tire bracket 23.

As shown in FIG. 6, the spare tire 4 is attached to the spare tire housing 5 through the spare tire bracket 23 and the spare tire spacer 24. In a housed state, the spare tire 4 is arranged in such an inclined state that its front part is located at a position higher than its rear part. In this embodiment in particular, as shown in FIG. 6, a front edge part 4a of the housed spare tire 4 is located at a position higher than an axis line C passing through the center of the rear bumper member 7, and a rear edge part 4b of the housed spare tire 4 is located at a position lower than the axis line C passing through the center of the rear bumper member 7.

Furthermore, as shown in FIGS. 2 and 4, reinforcement members 25 are arranged ahead of the spare tire housing 5 in the vehicle. The reinforcement members 25 are joined to the first rear cross member 13 and the respective rear side member front parts 10. The reinforcement members 25 are attached to both left and right sides of the spare tire housing 5 below the rear floor 3 in such a way as to sandwich a front part of the spare tire housing 5. The reinforcement members 25 are each formed to be obliquely bridged between the first rear cross member 13 and the corresponding rear side member front part 10, and extend along the periphery of the front part of the spare tire housing 5.

As shown in FIGS. 2 to 5, a second rear cross member (a cross member below the spare tire housing) 26 is arranged below the spare tire housing 5. The second rear cross member 26 is joined to the rear side member rear parts 11 located at both left and right sides thereof. In addition, the second rear cross member 26 extends in the vehicle width direction to be bridged between the rear side member rear parts 11 below the spare tire housing 5. In this embodiment, as shown in FIGS. 2 to 4, both left and right end parts of the second rear cross member 26 are each joined to a position near the division position 9 between the rear side member front part 10 and the rear side member rear part 11.

Figure 5:
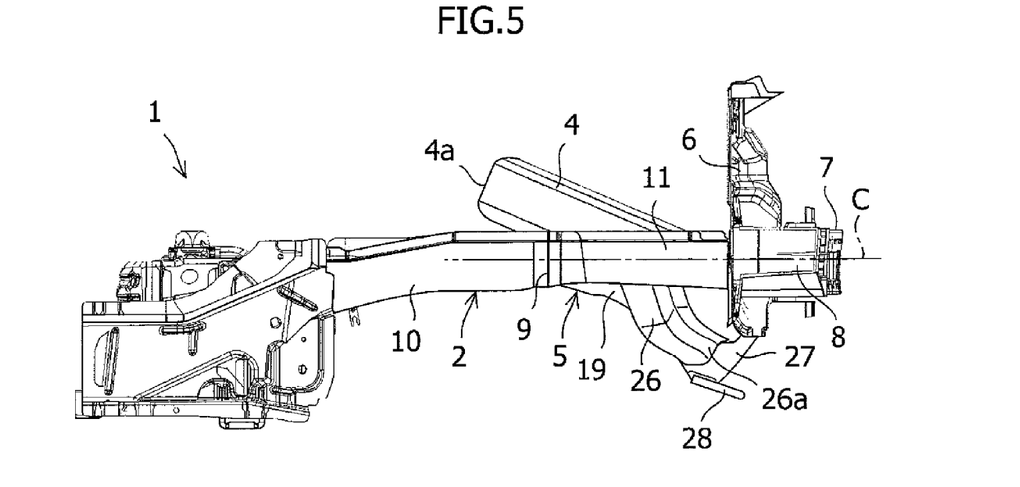
FIG. 5 is a view of the rear vehicle body according to the embodiment of the present invention, which is seen laterally.

As shown in FIGS. 3 to 5, a central part 26a in the vehicle width direction of the second rear cross member 26 extends rearward in the vehicle and is curved obliquely downward. Furthermore, as shown in FIG. 6, the central part in the vehicle width direction 26a of the second rear cross member 26 is formed to extend along a rear edge part 21a of the inclined part 21 of the spare tire housing 5.

Furthermore, as shown in FIGS. 5 and 6, a tow hook bracket 27 extending in the front-to-rear direction of the vehicle is arranged in the central part 26a in the vehicle width direction of the second rear cross member 26. As shown in FIG. 6, the tow hook bracket 27 has a front edge part 27a joined to the second rear cross member 26 and a rear edge part 27b joined to the rear edge part 3a of the rear floor 3. Furthermore, the rear edge part 27b of the tow hook bracket 27 is located behind the rear end of each rear side member rear part 11 so as to be more likely to receive a load from the rear.

Furthermore, as shown in FIG. 6, in an attached state, the tow hook bracket 27 forms a closed cross section with the second rear cross member 26 and the rear floor 3. Furthermore, as shown in FIG. 5, a tow hook 28 is attached to the tow hook bracket 27 by welding. The tow hook 28 has a front edge part attached to the tow hook bracket 27 and a rear edge part arranged to protrude from the tow hook bracket 27 obliquely downward rearward in the vehicle.

Next, a description will be given of how the members are deformed when a load is applied from the rear of the vehicle toward the front of the vehicle in the structure for the lower part of the rear vehicle body 1 according to this embodiment.

When a load is applied from the rear of the vehicle toward the front of the vehicle through the rear bumper member 7, the load is transmitted through the bumper attachment parts 8 to the back panel 6, the rear floor 3, the rear side members 2, and the second rear cross member 26.

Since the fragile part 12 is provided at the division position 9 of each rear side member 2, the rear end of the rear side member front part 10 and the front end of the rear side member rear part 11 at the division position 9 are bent upward, so that the rear side member 2 is bent upward in a convex shape. At the same time, the central part 26a in the vehicle width direction of the second rear cross member 26 obtains torque by the load and thereby helps deformation of the spare tire housing 5 below the spare tire housing 5. As a result, the boundary part 22 between the flat part 20 and the inclined part 21 of the spare tire housing is bent downward (bent upward in a convex shape).

When the rear side members 2 and the spare tire housing 5 are bent in the same direction, the load applied from the rear of the vehicle to the rear vehicle body 1 is absorbed. Furthermore, when the spare tire housing 5 is deformed by the load, the spare tire 4 arranged in an inclined manner is vertically rotated greatly in such a way that the front part thereof is moved rearward in the vehicle.

As described above, according to the structure for the lower part of the rear vehicle body 1 of this embodiment, each rear side member 2 is divided into the rear side member front part 10 and the rear side member rear part 11 in the front-to-rear direction of the vehicle. The second rear cross member 26 is joined to the rear side member rear part 11. The central part 26a in the vehicle width direction of the second rear cross member 26 extends rearward in the vehicle and is curved obliquely downward. The bottom surface 19 of the spare tire housing 5 includes the flat part 20 in the bottom surface front part and the inclined part 21 in the bottom surface rear part. The inclined part 21 in the bottom surface rear part of the spare tire housing 5 extends from the flat part 20 rearward in the vehicle and is inclined obliquely downward. The spare tire 4 is arranged in such an inclined state that its front part is located at a position higher than its rear part. Thus, each rear side member 2 is designed to be likely to be bent at the division position 9, and the bottom surface 19 of the spare tire housing 5 is also designed to be likely to be bent at the inclined part 21. Furthermore, since the rear side member 2 and the spare tire housing 5 are bent in the same direction (upward in a convex shape), the rear side member 2 and the spare tire housing 5 are deformed smoothly, so that the load applied to the rear vehicle body 1 can be reliably absorbed.

Furthermore, when a load is applied from the rear of the vehicle to the rear vehicle body 1, the spare tire 4 is vertically rotated greatly in such a way that the front part thereof is moved rearward in the vehicle. Accordingly, the front edge 4a of the spare tire 4 never comes into contact with structures arranged in the front, such as the fuel tank 16, at the time of the rotation of the spare tire 4.

Furthermore, when a load is applied from the rear of the vehicle to the rear vehicle body 1, the bottom surface rear part of the spare tire housing 5 is bent downward. This prevents the spare tire housing 5 from moving forward, so that the bottom surface 19 of the spare tire housing 5 never comes into contact with structures arranged in the front, such as the fuel tank 16.

Furthermore, according to the structure for the lower part of the rear vehicle body 1 of this embodiment, the rear side member front part 10 is more rigid than the rear side member rear part 11. Accordingly, when a load is applied from the rear of the vehicle to the rear vehicle body 1, the rear side member 2 is deformed in such a way that the less rigid rear side member rear part 11 is first deformed, and the rear side member 2 is bent at the division position 9 after the rear side member rear part 11 is deformed to some extent. Hence, when a load is applied from the rear of the vehicle to the rear vehicle body 1, the load can be effectively absorbed by the deformation of the rear side member rear part 11.

Furthermore, according to the structure for the lower part of the rear vehicle body 1 of this embodiment, the fragile part 12 which is less rigid than the rear side member front part 10 and the rear side member rear part 11 is provided at the division position of the rear side member front part 10 and the rear side member rear part 11. Thus, the rear side member 2 is more likely to be bent at the division position 9. Thereby, the rear side member 2 and the spare tire housing 5 are deformed more smoothly, so that the load applied to the rear vehicle body 1 can be more effectively absorbed.

Furthermore, according to the structure for the lower part of the rear vehicle body 1 of this embodiment, the tow hook bracket 27 extending in the front-to-rear direction of the vehicle is provided in the central part 26a in the vehicle width direction of the second rear cross member 26. The tow hook bracket 27 has the front edge part 27a joined to the second rear cross member 26 and the rear edge part 27b joined to the rear edge part 3a of the rear floor 3. Thus, when a load is applied from the rear of the vehicle to the rear vehicle body 1, the load is transmitted to the central part 26a in the vehicle width direction of the second rear cross member 26 through the tow hook bracket 27. In other words, the load from the rear of the vehicle is more likely to be transmitted to the central part 26a in the vehicle width direction of the second rear cross member 26, which helps deformation of the spare tire housing 5. Thereby, the spare tire housing 5 can be deformed more reliably and quickly. As a result, the load applied to the rear vehicle body 1 can be more effectively absorbed, and the spare tire 4 can be rotated reliably.

Furthermore, according to the structure for the lower part of the rear vehicle body 1 of this embodiment, the boundary part 22 between the flat part 20 and the inclined part 21 of the spare tire housing 5 is formed substantially linearly in the vehicle width direction, and the boundary part 22 between the flat part 20 and the inclined part 21 is located at the same position in the front-to-rear direction of the vehicle as the division position 9 of the rear side member front part 10 and the rear side member rear part 11. Accordingly, when a load is applied from the rear of the vehicle to the rear vehicle body 1, the bottom surface 19 of the spare tire housing 5 is bent linearly at the boundary part 22. Moreover, since the position at which the rear side member 2 is bent is located at the same position in the front-to-rear direction of the vehicle as the position at which the spare tire housing 5 is bent, the rear side member 2 and the spare tire housing 5 are likely to be bent in the same direction when a load is applied from the rear of the vehicle to the rear vehicle body 1. Thereby, the rear side member 2 and the spare tire housing 5 can be deformed more reliably and quickly. As a result, the load applied to the rear vehicle body 1 can be more effectively absorbed, and the spare tire 4 can be rotated reliably.

Furthermore, according to the structure for the lower part of the rear vehicle body 1 of this embodiment, the second rear cross member 26 is joined to a position near the division position 9 between the rear side member front part 10 and the rear side member rear part 11. Thus, when a load is applied from the rear of the vehicle to the rear vehicle body 1, the load transmitted to the central part 26a in the vehicle width direction of the second rear cross member 26 is transmitted to the division position 9 of the rear side member front part 10 and the rear side member rear part 11, which further helps the rear side member 2 to be bent at the division position 9. Thereby, the rear side member 2 is deformed more smoothly, so that the load applied to the rear vehicle body 1 can be more reliably absorbed.

Furthermore, according to the structure for the lower part of the rear vehicle body 1 of this embodiment, the spare tire bracket 23 is arranged in the inclined part 21 in the bottom surface rear part of the spare tire housing 5. Moreover, the spare tire 4 is attached to the spare tire housing 5 through the spare tire bracket 23. Accordingly, the spare tire 4 is attached to the spare tire housing 5 on the side bent downward (inclined part 21). Thereby, the load from the rear floor 3 is effectively transmitted to the spare tire bracket 23, which further helps the front part of the spare tire 4 to rotate rearward in the vehicle.

Furthermore, according to the structure for the lower part of the rear vehicle body 1 of this embodiment, the front edge part 4a of the housed spare tire 4 is located at a position higher than the axis line C passing through the center of the rear bumper member 7, and the rear edge part 4b of the housed spare tire 4 is located at a position lower than the axis line C passing through the center of the rear bumper member 7. With this structure, the location at which the load from the rear of the vehicle is first applied (rear bumper member 7) is located at substantially the same position in the front-to-rear direction of the vehicle as the center of rotation of the spare tire 4. Thus, torque is likely to be generated in the spare tire 4, which further helps the spare tire 4 to rotate.

Furthermore, the structure for the lower part of the rear vehicle body 1 of this embodiment further includes the first rear cross member 13 which is arranged ahead of the spare tire housing 5 in the vehicle and joined to the rear side members 2 located at both left and right sides thereof, and the first rear cross member 13 is joined to each rear side member front part 10. This inhibits a part ahead of the first rear cross member 13 in front of the spare tire housing 5 from being deformed. This also helps deformation of the rear floor 3, which further helps the front part of the spare tire 4 to rotate rearward in the vehicle.

Furthermore, the structure for the lower part of the rear vehicle body 1 of this embodiment further includes the reinforcement member 25 which is joined to the first rear cross member 13 and the rear side member front part 10 and extends along the periphery of the front part of the spare tire housing 5. This makes the bottom surface front part of the spare tire housing 5 more rigid, and thereby makes the bottom surface front part of the spare tire housing 5 less likely to be bent when a load is applied from the rear of the vehicle to the rear vehicle body 1. Thus, only the bottom surface rear part of the spare tire housing 5 is neatly bent while the bottom surface front part of the spare tire housing 5 is kept undeformed. Thus, torque is likely to be generated in the spare tire 4, which further helps the spare tire 4 to rotate.

Hereinabove, the embodiment of the present invention has been described. However, the present invention is not limited to the embodiment described above. Various changes and modifications may be made according to the technical idea of the present invention.

In the above embodiment, the rear side member front part 10 is more rigid than the rear side member rear part 11. The methods for improving the rigidity of the rear side member front part 10 may include a method of attaching a reinforcement member to the rear side member front part 10.

DESCRIPTION OF REFERENCE SYMBOLS

1 REAR PART OF VEHICLE BODY
2 REAR SIDE MEMBER
3 REAR FLOOR
4 SPARE TIRE
5 SPARE TIRE HOUSING
6 BACK PANEL
7 REAR BUMPER MEMBER
8 BUMPER ATTACHMENT PART
9 DIVISION POSITION OF REAR SIDE MEMBER
10 REAR SIDE MEMBER FRONT PART
11 REAR SIDE MEMBER REAR PART
12 FRAGILE PART
13 FIRST REAR CROSS MEMBER (CROSS MEMBER IN FRONT OF SPARE TIRE HOUSING)
14 CENTER CROSS MEMBER
15 SIDE CROSS MEMBER
16 FUEL TANK
17 EXHAUST PIPE
18 MUFFLER
19 BOTTOM SURFACE OF SPARE TIRE HOUSING
20 FLAT PART
21 INCLINED PART
22 BOUNDARY PART BETWEEN FLAT PART AND INCLINED PART
23 SPARE TIRE BRACKET
24 SPARE TIRE SPACER
25 REINFORCEMENT MEMBER
26 SECOND REAR CROSS MEMBER (CROSS MEMBER BELOW SPARE TIRE HOUSING)
27 Tow Hook Bracket
28 TOW HOOK

What is claimed:

1. A structure for a lower part of a rear vehicle body, comprising:
a spare tire housing which is formed in a rear floor of the rear vehicle body and configured to house a spare tire;
a cross member below the spare tire housing which is arranged below the spare tire housing and joined to rear side members located at both left and right sides thereof; and
a rear bumper member which is arranged in a rear edge part of the rear floor, wherein
a bottom surface rear part of the spare tire housing includes an inclined part extending rearward in the vehicle and being inclined obliquely downward, and the spare tire is arranged in such an inclined state that a front part thereof is located at a position higher than a rear part thereof, and
each rear side member is divided into a rear side member front part and a rear side member rear part in a front-to-rear direction of the vehicle, the cross member below the spare tire housing is joined to the rear side member rear part, and a central part in a vehicle width direction of the cross member below the spare tire housing extends rearward in the vehicle and is curved obliquely downward.

2. The structure for a lower part of a rear vehicle body according to claim 1, wherein the rear side member front part is more rigid than the rear side member rear part.

3. The structure for a lower part of a rear vehicle body according to claim 1, wherein a fragile part which is less rigid than the rear side member front part and the rear side member rear part is provided at a division position of the rear side member front part and the rear side member rear part.

4. The structure for a lower part of a rear vehicle body according to claim 1, wherein a tow hook bracket extending in the front-to-rear direction of the vehicle is provided in the central part in the vehicle width direction of the cross member below the spare tire housing, and the tow hook bracket has a front edge part joined to the cross member below the spare tire housing and a rear edge part joined to the rear edge part of the rear floor.

5. The structure for a lower part of a rear vehicle body according to claim 1, wherein
a bottom surface front part of the spare tire housing includes a flat part,
the inclined part in the bottom surface rear part of the spare tire housing extends from the flat part rearward in the vehicle and is inclined obliquely downward, a boundary part between the flat part and the inclined part is formed substantially linearly in the vehicle width direction, and the boundary part between the flat part and the inclined part is located at the same position in the front-to-rear direction of the vehicle as the division position of the rear side member front part and the rear side member rear part.

6. The structure for a lower part of a rear vehicle body according to claim 1, wherein the cross member below the spare tire housing is joined to each of the rear side member rear parts at a position near the division position of the rear side member front and rear parts.

7. The structure for a lower part of a rear vehicle body according to claim 1, wherein a spare tire bracket is arranged in the inclined part of the bottom surface rear part of the spare tire housing, and the spare tire is attached to the spare tire housing with the spare tire bracket.

8. The structure for a lower part of a rear vehicle body according to claim 1, wherein a front edge part of the housed spare tire is located at a position higher than an axis line passing through the center of the rear bumper member, and a rear edge part of the housed spare tire is located at a position lower than the axis line passing through the center of the rear bumper member.

9. The structure for a lower part of a rear vehicle body according to claim 1, further comprising a cross member in front of the spare tire housing which is arranged ahead of the spare tire housing in the vehicle and joined to the rear side members located at both left and right sides thereof, wherein
the cross member in front of the spare tire housing is joined to each rear side member front part.

10. The structure for a lower part of a rear vehicle body according to claim 9, further comprising a reinforcement member which is joined to the cross member in front of the spare tire housing and the rear side member front part, and extends along a periphery of a front part of the spare tire housing.

* * * * *